(12) United States Patent
Hardy (10) Patent No.: US 8,037,833 B2
(45) Date of Patent: Oct. 18, 2011

(54) STACKABLE TRAY AND INVENTORY SYSTEM WITH STACKABLE TRAYS

(75) Inventor: Stephen Hardy, Wadsworth, OH (US)

(73) Assignee: RTC Industries Inc., Rolling Meadows, IL (US)

( * ) Notice: Subject to any disclaimer, the term of this patent is extended or adjusted under 35 U.S.C. 154(b) by 511 days.

(21) Appl. No.: 12/121,322

(22) Filed: May 15, 2008

(65) Prior Publication Data

US 2008/0290056 A1    Nov. 27, 2008

Related U.S. Application Data

(60) Provisional application No. 60/939,291, filed on May 21, 2007.

(51) Int. Cl.
*A47B 7/00* (2006.01)
(52) U.S. Cl. .................. 108/91; 211/133.1; 211/126.7; 211/128.1
(58) Field of Classification Search ............ 108/53.1, 108/53.3, 53.5, 32, 28, 91, 92, 180; 211/49.1, 211/133.1, 126.7, 188, 128.1
See application file for complete search history.

(56) References Cited

U.S. PATENT DOCUMENTS

| | | | | |
|---|---|---|---|---|
| 18,321 A * | 10/1857 | Carsley | ................. | 108/101 |
| 392,735 A * | 11/1888 | Koerner | ................. | 108/53.1 |
| 2,563,212 A * | 8/1951 | Cole | ................. | 108/91 |
| 2,641,383 A * | 6/1953 | Coursey | ................. | 206/506 |
| 2,651,868 A * | 9/1953 | Siegel | ................. | 108/91 |
| 2,825,466 A * | 3/1958 | Shnitzler et al. | ................. | 211/49.1 |
| 4,632,412 A * | 12/1986 | Nasgowitz | ................. | 108/91 |
| 4,744,474 A * | 5/1988 | Tallving | ................. | 211/133.1 |
| 5,129,525 A * | 7/1992 | Maynard, Jr. | ................. | 211/205 |
| 5,996,812 A * | 12/1999 | Sokol, Jr. | ................. | 211/133.2 |
| 6,626,634 B2 * | 9/2003 | Hwang et al. | ................. | 108/53.1 |
| 7,377,396 B2 * | 5/2008 | Keen | ................. | 211/49.1 |
| 2009/0178989 A1 * | 7/2009 | Accuardi | ................. | 211/126.7 |

* cited by examiner

*Primary Examiner* — Jose V Chen
(74) *Attorney, Agent, or Firm* — Banner & Witcoff, Ltd.

(57) ABSTRACT

Disclosed herein is an inventory system with stackable trays that permits access to individual trays. The inventory system comprises an upright pole having a top and bottom, a support attached to the bottom of the pole, and at least two stackable trays, each tray having a fastening device to engage a back of the tray to the pole, wherein when a tray is moved away from the pole, the fastening device disengages the pole, and when a tray is pushed toward the pole, the fastening device can engage the pole. Also disclosed is a stackable tray. Also disclosed is method for removing a lower stacked tray from underneath a higher stacked tray.

17 Claims, 7 Drawing Sheets

STACKABLE TRAY AND INVENTORY SYSTEM WITH STACKABLE TRAYS

FIELD OF THE INVENTION

This disclosure relates to a stackable tray and an inventory system with stackable trays.

BACKGROUND OF THE INVENTION

Retail store locations, such as grocery stores, drug stores, discount stores, and convenience stores, typically use shelving both to store and display items, such as yogurt. Frequently such items are not displayed in stores using the same shipping containers (e.g., cardboard boxes and other shipping systems, such as a combination of cardboard trays and plastic wrap) that are used to ship the items to the stores. Rather, items are frequently taken out of shipping containers and placed in display systems within stores.

Hand-trucks are frequently used to move shipping containers between store display systems in areas where customers select products for purchase and backroom storage areas (including but not limited to backroom coolers) and/or store shipment areas.

Frequently, shipping systems are opened from the top to access products within the systems. Thus, when shipping systems, such as cardboard boxes, are stacked on top of each other on a typical hand-truck, access is limited to the top of the top stacked shipping system or box.

When items like overstock or expired items are to be sent from a store display area to a backroom storage area and/or a store shipment area, such items frequently are placed into a shipping system, such as cardboard box, from the top, and then the individual shipping systems are stacked on top of one another on a hand-truck. Sometimes, the original shipping system may have been discarded and/or otherwise is not available for this purpose.

BRIEF SUMMARY OF THE INVENTION

In accordance with a first aspect, an inventory system or apparatus is provided with stackable trays that permits access to individual trays. The inventory system can comprise an upright pole, a support attached to the pole, a first stackable tray over the support, a second stackable tray stacked over the first stackable tray, each tray having a fastening device to engage a back portion of the tray to the pole, wherein when a tray is moved away from the pole, the fastening device can disengage the pole, and when the tray is moved toward the pole, the fastening device can engage the pole. Each tray can be of any suitable design for supporting products.

In accordance with a second aspect, a tray is provided that is suitable for supporting products, the tray comprising a bottom, a front, a back, a first side and a second side, the first side and second side of the tray each having a front edge and a back edge, the front edges and the back edges sloping downwardly from the front of the tray and in a direction towards the back of the tray. The first side and the second side of the tray can each have either a top channel corresponding to a bottom surface of another tray, and a bottom surface corresponding to a top channel of another tray, or a top surface corresponding to a bottom channel of another tray, and a bottom channel corresponding to a top surface of another tray.

In accordance with a third aspect, a method is provided comprising positioning a first stackable tray between a second stackable tray and a support, each stackable tray comprising a bottom, a front, a back, a first side and a second side, the first side and second side of each tray each having a front edge and a back edge, the front edges and the back edges sloping downwardly from the front of the tray and in a direction towards the back of the tray, fastening a back of the first stackable tray and a back of the second stackable tray to a pole, the first stackable tray being in a first position when fastened to the pole, unfastening the back of the first stackable tray from the pole, and moving the first stackable tray away from the pole. As the first stackable tray is moved away from the pole, the second stackable tray slides down the pole and the front edges of the second stackable tray slide along the back edges of the first stackable tray until the second stackable tray reaches the first position of the first stackable tray.

Further objects, features and advantages of the present invention will become apparent from the following drawings and detailed description. The following drawings and detailed description afford a comprehensive understanding of the present invention. However, it should be understood that the described preferred embodiments are illustrative only, since various modifications within the spirit and scope of the invention may become apparent to those of ordinary skill in the art who have benefited from this disclosure.

BRIEF DESCRIPTION OF THE DRAWINGS

Non-limiting embodiments will now be described with reference to the accompanying drawings.

DETAILED DESCRIPTION OF EMBODIMENTS OF THE INVENTION

In one aspect, the front portion of each tray can slope downwardly towards the pole.

Figure 1:
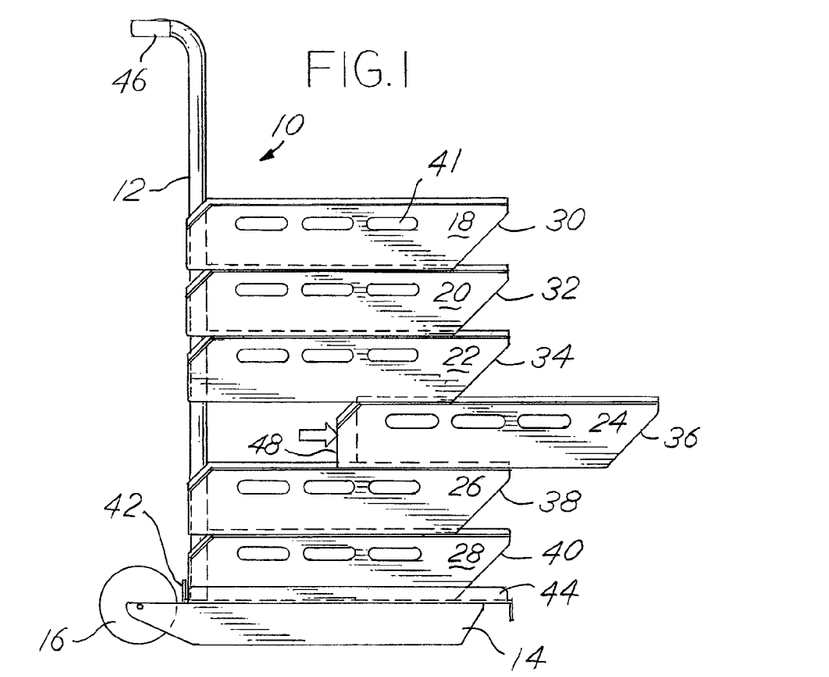
FIG. 1 is a side view of an embodiment of an inventory system of the present invention illustrating a tray being pulled away from the pole of the inventory system.
Figure 2:
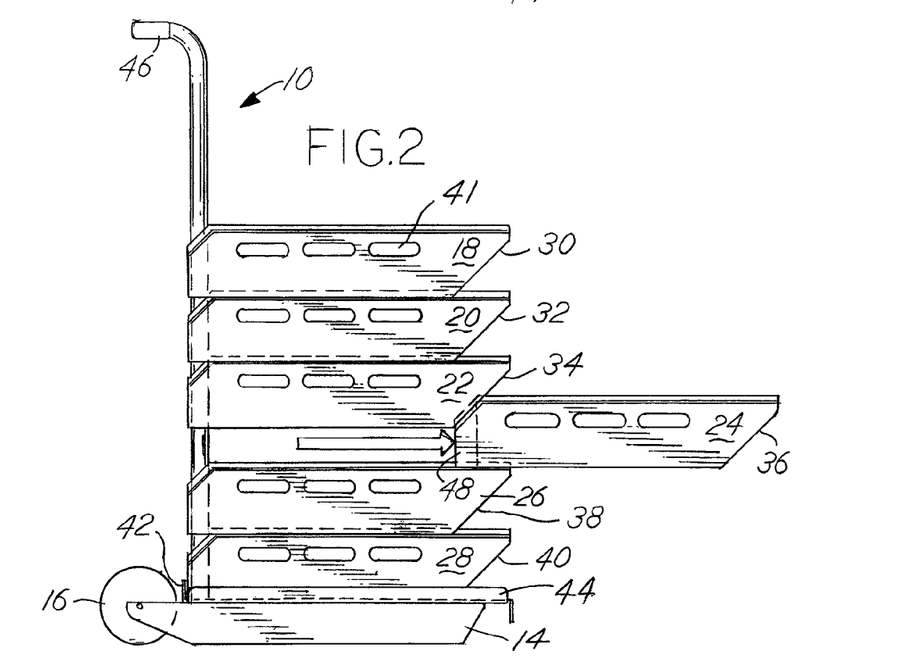
FIG. 2 is a side view of the embodiment shown in FIG. 1 illustrating the tray above the pulled tray descending along a slope.

As shown in FIGS. 1-2, an embodiment of an inventory system 10 comprises upright pole 12, a support 14 attached to pole 12, and at least two stackable trays. Inventory system 10 can have at least one wheel 16 attached to support 14. In the embodiment shown, there are six stackable trays, 18, 20, 22, 24, 26, and 28. In the embodiment shown in FIG. 1, each stackable tray has a front portion that slopes downwardly towards pole 12. More specifically, trays 18, 20, 22, 24, 26, and 28 have front portions with slopes 30, 32, 34, 36, 38, and 40, respectively. The trays can also have side handles 41. Handles 41 can be any suitable handle design, including but not limited openings (e.g., oval openings, which can be elongated to resemble the shape a racetrack).

Inventory system 10 can have a back stop 42, and left and right glides 44. Inventory system 10 can also have a handle 46 as shown in FIGS. 1-2.

As shown in FIG. 2, when tray 24 is pulled away from pole 12, to the point where back portion 48 reaches slope 34, tray 22 begins to slide down back portion 48 along slope 34. As tray 22 begins its downward descent, trays 20 and 18 also move downwardly.

In one embodiment, inventory system 10 can have two or more than one wheels 16. Inventory system 10 can have any suitable handle 46, for example, for tipping the inventory system so that the weight of the system rests on the wheel(s).

Each tray can be of any suitable design for supporting products.

While only slopes are shown for the front portions of the trays depicted in FIG. 1, slopes can also be placed at the back portions of trays instead of the front portions or in combination with slopes at the front portions of the trays. Thus, the front and/or back portions of the trays can slope downwardly towards the pole so that when a first tray in a first position is pulled away from the pole, a second tray on top of the first tray will slide along the slope(es) until it reaches the first position of the pulled tray.

Figure 3:
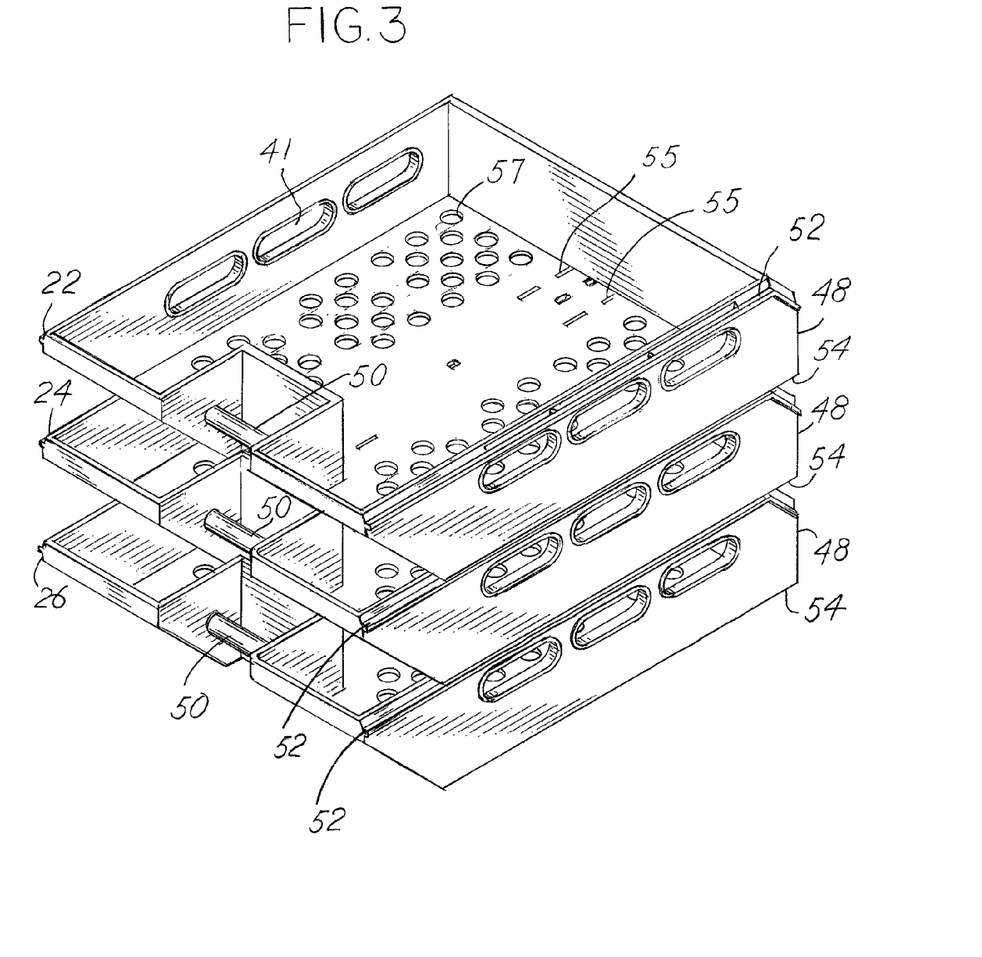
FIG. 3 is a front perspective view of three stacked trays in an embodiment of the present invention.

FIGS. 3 through 6 are front perspective views of three stacked trays in an embodiment of the present invention. Trays 22, 24, and 26 each have a front handle 50. Each tray has channels 52 on the left and right sides to slide along a bottom surface 54 of the tray above. As shown in FIGS. 3 through 6, as tray 24 is pulled away from pole 12 (not shown in FIGS. 3-6), and trays 22 and 26, bottom surface 54 of tray 24 slides along channel 52 of tray 26, and channel 52 of tray 24 slides along bottom surface 54 of tray 22. In an alternative embodiment (not shown in the drawings) the sides can have a top surface corresponding to a bottom channel of another tray, and a bottom channel corresponding to a top surface of another tray. As shown in FIG. 3, the trays can be designed so that even when they are stacked, product can be placed in each tray or removed from each tray from the front of the tray without moving or sliding any of the trays. Trays can have holes 57 to provide ventilation and/or reduce the amount of material used to make the trays.

Figure 4:
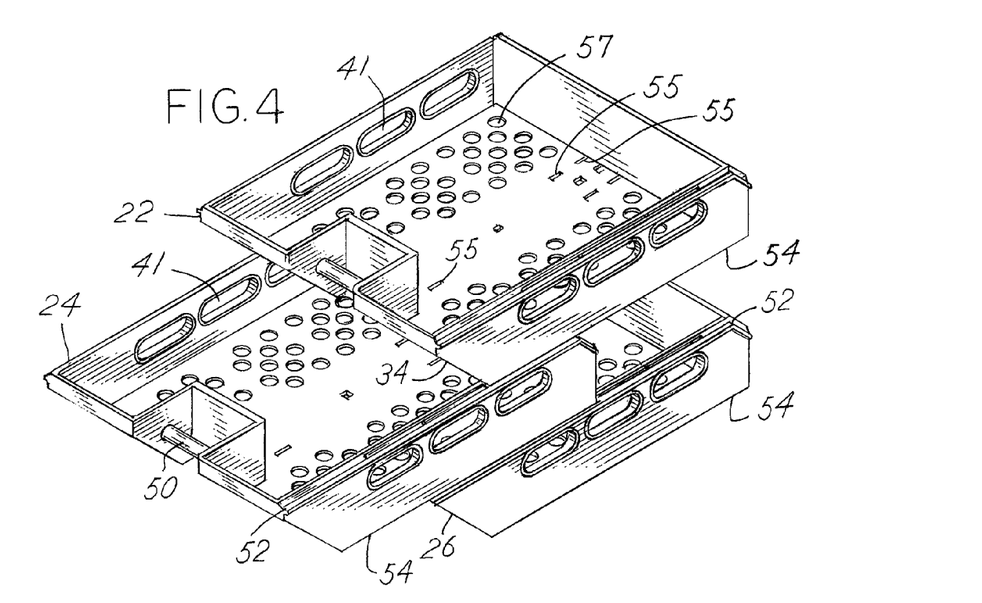
FIG. 4 is a front perspective view of the embodiment shown in FIG. 3 illustrating the middle tray being pulled away from the other two trays, wherein the inside of the middle tray becomes more accessible than in FIG. 3.

FIG. 4 is a front perspective view of the embodiment shown in FIG. 3 illustrating the middle tray 24 being pulled away from the other two trays, wherein the inside of the middle tray 24 becomes more accessible than that shown in FIG. 3.

Figure 5:
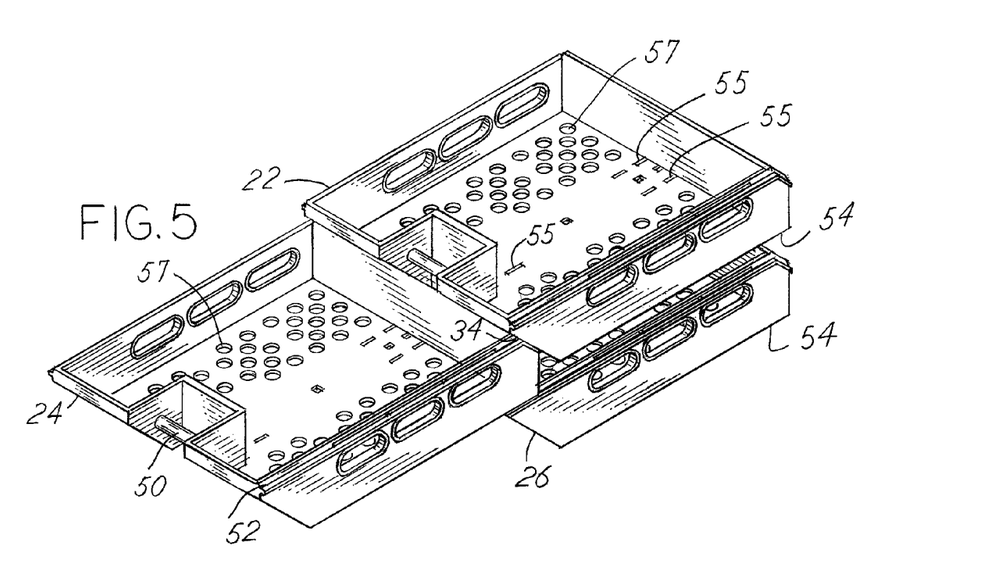
FIG. 5 is a front perspective view of the embodiment shown in FIG. 4, further illustrating the top tray descending along a slope.

FIG. 5 is a front perspective view of the embodiment shown in FIG. 4, further illustrating the top tray 22 descending along a slope 34.

Figure 6:
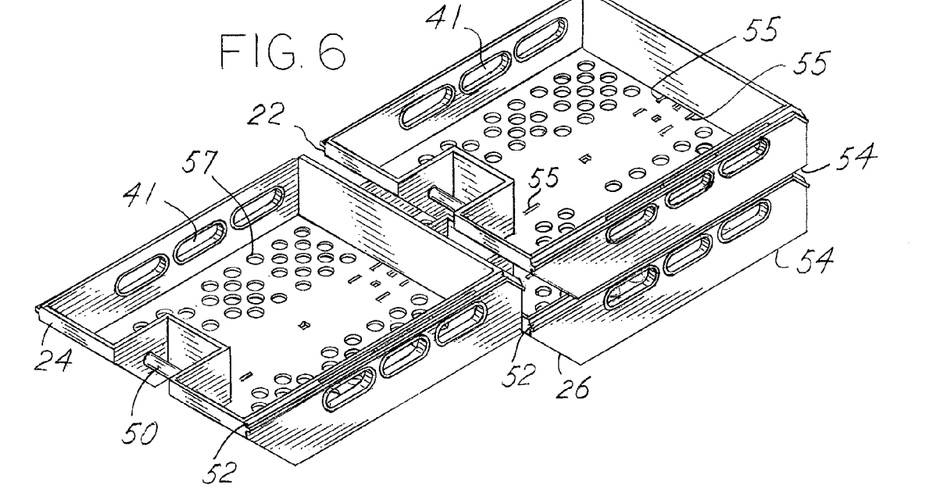
FIG. 6 is a front perspective view of the embodiment shown in FIG. 5, wherein the top tray has descended to the original position of the middle tray.
Figure 7:
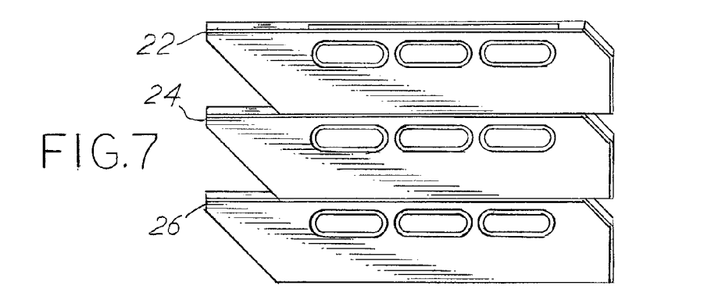
FIGS. 7 through 10 are side views corresponding to FIGS. 3 through 6, respectively.
Figure 8:
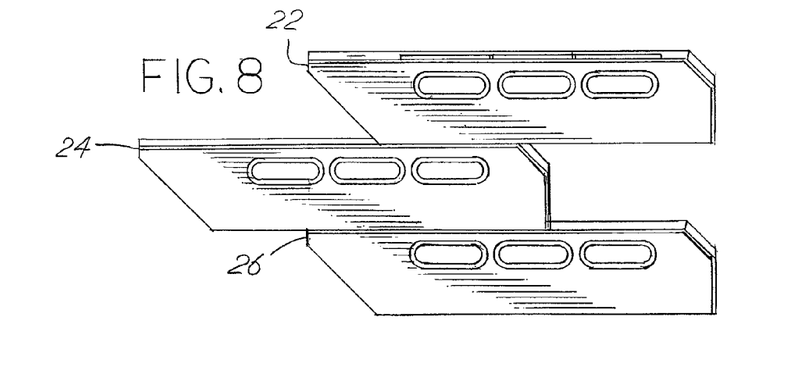
Figure 9:
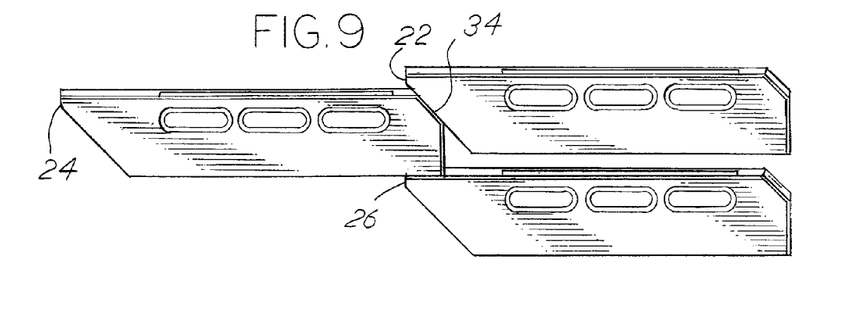
Figure 10:
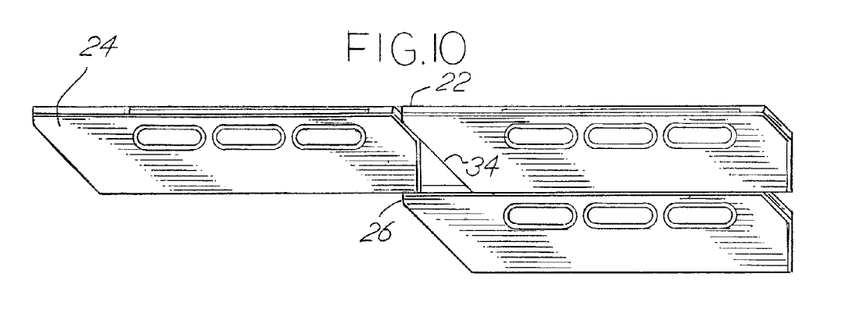

FIG. 6 is a front perspective view of the embodiment shown in FIG. 5, wherein the top tray 22 has descended to the original position of the middle tray 24. As shown in FIGS. 3-6, slots 55 can be used to retain dividers (not shown) to separate items as may be desired.

FIGS. 7 through 10 are side views corresponding to FIGS. 3 through 6, respectively.

Figure 11:
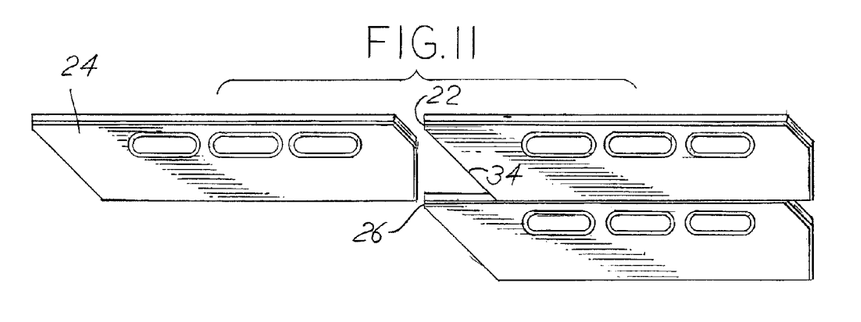
FIG. 11 is a side view illustrating the middle tray in relation to two other trays after the middle tray has been pulled clear of the other two trays.

FIG. 11 is a side view illustrating the middle tray 24 after the middle tray has been pulled clear of the other two trays 22 and 26.

Figure 12:
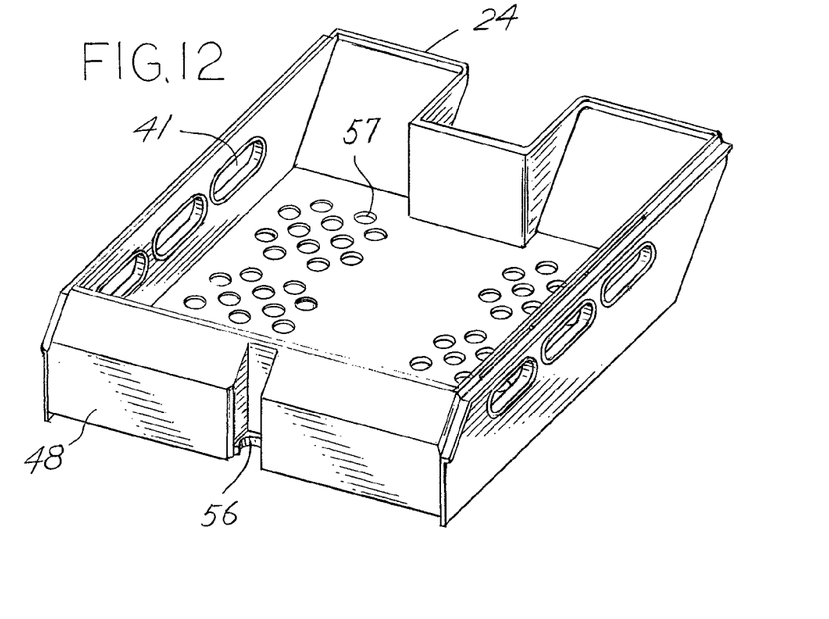
FIG. 12 is a rear perspective view of a tray illustrating various aspects of the invention.

FIG. 12 is a rear perspective view of tray 24 illustrating various aspects of the invention. As shown in FIG. 12, tray 24 has a clamp 56 at rear portion 48. Clamp 56 can be any suitable clamp for attaching tray 24 to pole 12.

Figure 13:
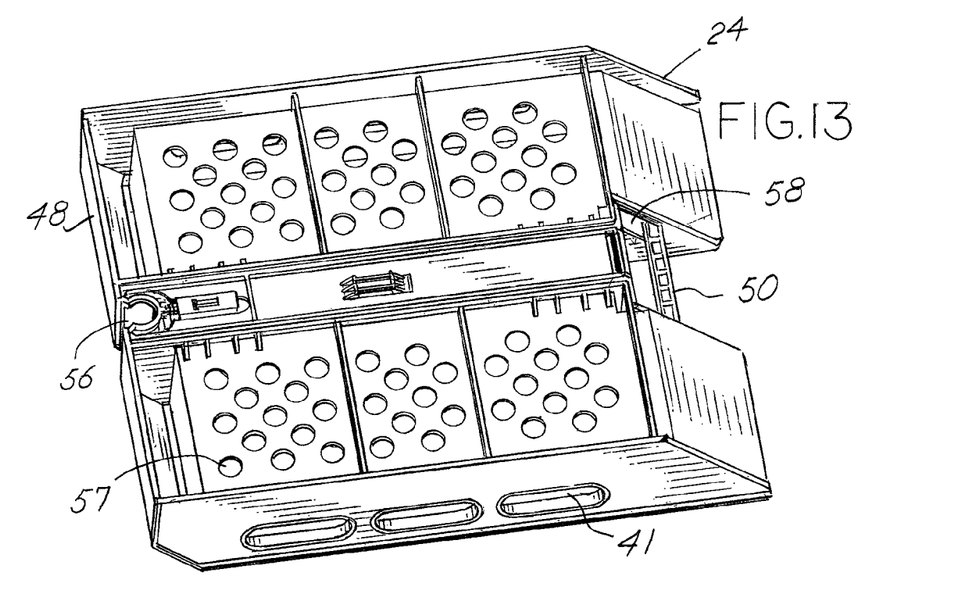
FIG. 13 is a bottom view of tray illustrating various aspects of the invention.

FIG. 13 is a bottom view of tray 24 illustrating various aspects of the invention. As shown in FIG. 13, clamp 56 is a C-shaped clamp. Tray handle 50 can move in slot 58.

Figure 14:
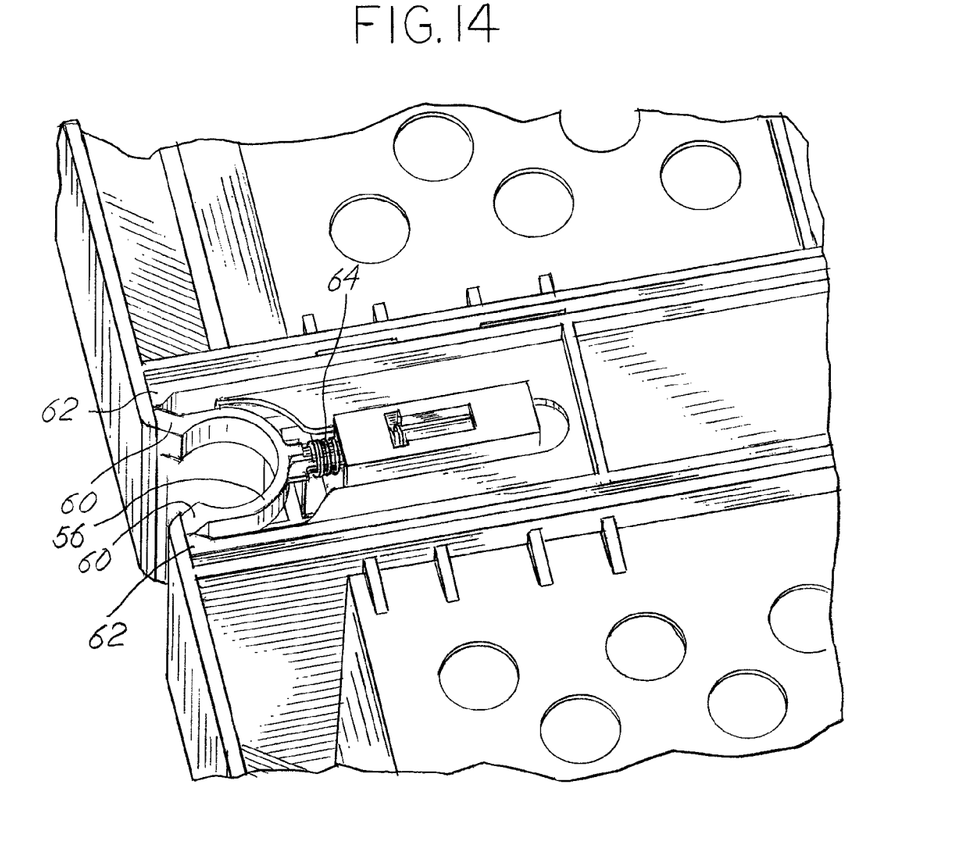
FIG. 14 is a bottom view of a tray portion illustrating various aspects of the invention.

FIG. 14 is a bottom view of a portion of tray 24 illustrating various aspects of the invention. As shown in FIG. 14, the ends 60 of clamp 56 can be engaged by grips 62. Grips 62 can be attached to handle 50. As handle 50 is pulled away from pole 12, grips 62 disengage ends 60 of clamp 56, and ends 60 expand a sufficient amount so that clamp 56 can be pulled off of pole 12. When handle 50 is pushed towards pole 12 a sufficient amount, grips 62 can engage ends 60 of clamp 56, and clamp 56 can be fastened to pole 12. Clamp 56 can also have spring 64 as shown in FIG. 14.

The present invention has been described in detail with particular reference to certain preferred embodiments thereof, and those of skill in the art will appreciate that variations and modifications are within the spirit and scope of the present invention.

I claim:

1. An apparatus comprising:
an upright pole having a top and a bottom,
a support attached to the bottom of the pole, and
at least a first stackable tray, and at least a second stackable tray, the first stackable tray positioned below the second stackable tray and above the support, each tray having a bottom, a front, a back, a first side and a second side that define an inside of the tray, each tray having a fastening device to engage the back of the tray to the pole, at least the first or second stackable tray adapted to slide perpendicularly away from the pole so that the fastening device of that tray can disengage the pole, the at least first or second stackable tray adapted to slide perpendicularly toward the pole so that the fastening device of that tray can engage the pole, each tray comprising a front edge and a back edge, each front edge and each back edge sloping downwardly in a direction towards the pole, the first stackable tray being in a first position when it is engaged with the pole and a second position when it is removed from between the support and the second stackable tray, wherein as the first stackable tray is slid perpendicularly away from the pole from its first position to its second position, the second stackable tray slides down the pole and the front edge of the second stackable tray slides along the back edge of the first stackable tray until the second stackable tray reaches the first position of the first stackable tray.

2. The apparatus of claim 1, wherein the fastening device is a clamp.

3. The apparatus of claim 1, wherein at least one tray has handle at a front portion of the tray.

4. The apparatus of claim 1, wherein at least one stackable tray has a first handle on its first side and a second handle on its second side.

5. The apparatus of claim 4, wherein each side handle is defined by an opening in the at least one stackable tray.

6. The apparatus of claim 1, the support comprising a back stop and first and second glides, the first and second glides positioned below the first stackable tray, the first stackable tray slidable along the glides either towards the back stop or away from the back stop.

7. The apparatus of claim 1, wherein the pole has a handle at the top of the pole.

8. The apparatus of claim 1, wherein the support comprising at least one wheel that bears the weight of the apparatus when the pole is tipped downwardly.

9. The apparatus of claim 1, the first stackable tray being in a first position when engaged with the pole, and in an intermediate position when it is not engaged with the pole and a portion of the second stackable tray is over a portion of the first stackable tray, wherein the inside of the first stackable tray is more accessible when the first stackable tray is in the intermediate position than when it is in the first position.

10. The apparatus of claim 9, wherein the first stackable tray is adapted to be slid perpendicularly relative to the pole from the intermediate position to its first position and from its first position to the intermediate position.

11. An apparatus comprising:
an upright pole having a top and a bottom,
a support attached to the bottom of the pole, and
at least a first stackable tray, and at least a second stackable tray, the first stackable tray positioned below the second stackable tray and above the support, each tray having a bottom, a front, a back, a first side and a second side that define an inside of the tray, each tray having a fastening device to engage the back of the tray to the pole, at least the first or second stackable tray adapted to slide perpendicularly away from the pole so that the fastening device of that tray can disengage the pole, the at least first or second stackable tray adapted to slide perpendicularly toward the pole so that the fastening device of that tray can engage the pole, each tray comprising a front edge and a back edge, each front edge and each back edge sloping downwardly in a direction towards the pole, the first stackable tray being in a first position when it is engaged with the pole and a second position when it is removed from between the support and the second stackable tray, wherein as the first stackable tray is slid perpendicularly away from the pole from its first position to its second position, the second stackable tray slides down the pole and the front edge of the second stackable tray slides along the back edge of the first stackable tray until the second stackable tray reaches the first position of the first stackable tray,
the first stackable tray being in a first position when engaged with the pole, and in an intermediate position when it is not engaged with the pole and a portion of the second stackable tray is over a portion of the first stackable tray, wherein the inside of the first stackable tray is more accessible when the first stackable tray is in the intermediate position than when it is in the first position,
further comprising a third stackable tray, the third stackable tray having a bottom, a front, a back, a first side and a second side, and a fastening device to engage the back of the third stackable tray to the pole, the second stackable tray being in an initial position when engaged with the pole, and in an extended position when it is not engaged with the pole and a portion of the third stackable tray is over a portion of the second stackable tray, the second stackable tray being between the first stackable tray and the third stackable tray, wherein the inside of the second stackable tray is more accessible when the second stackable tray is its extended position than in its initial position.

12. The apparatus of claim 11, wherein the second stackable tray is adapted to be slid perpendicularly away from the pole from its initial position to its extended position, and slid perpendicularly toward the pole from its extended position to its initial position.

13. The apparatus of claim 11, each tray comprising a front edge and a back edge, each front edge and each back edge sloping downwardly in a direction towards the pole.

14. The apparatus of claim 13, wherein as the second stackable tray is slid perpendicularly away from the pole and is removed from between the first stackable tray and the third stackable tray, the third stackable tray slides down the pole, and the front edge of the third stackable tray slides along the back edge of the second stackable tray until the third stackable tray reaches the initial position of the second stackable tray.

15. The apparatus of claim 1, wherein the first side and the second side of the tray each have a top channel corresponding to a bottom surface of another tray, wherein the first side and the second side of the tray each have a bottom surface corresponding to a top channel corresponding to a first side and a second side of another tray.

16. A method comprising:
positioning a first stackable tray between a second stackable tray and a support, each stackable tray comprising a bottom, a front, a back, a first side and a second side, a front edge and a back edge, each front edge and each back edge sloping downwardly in a direction towards a pole,
fastening a back the first stackable tray and a back of the second stackable tray to the pole, the first stackable tray being in a first position when fastened to the pole,
unfastening the back of the first stackable tray from the pole, and
sliding the first stackable tray away from the pole in a direction perpendicular to the pole, wherein as the first stackable tray is slid away from the pole, the second stackable tray slides down the pole and the front edge of the second stackable tray slides along the back edge of the first stackable tray until the second stackable tray reaches the first position of the first stackable tray.

17. The method of claim 16 wherein the first side and the second side of each tray each have either a top channel corresponding to a bottom surface of another tray, and a bottom surface corresponding to a top channel of another tray, or a top surface corresponding to a bottom channel of another tray, and a bottom channel corresponding to a top surface of another tray.

* * * * *